(12) United States Patent
Akama

(10) Patent No.: US 7,149,532 B2
(45) Date of Patent: Dec. 12, 2006

(54) POSITIONAL INFORMATION PROVIDING METHOD AND POSITIONAL INFORMATION PROVIDING SYSTEM

(75) Inventor: Katsuaki Akama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 176 days.

(21) Appl. No.: 10/939,723

(22) Filed: Sep. 14, 2004

(65) Prior Publication Data

US 2005/0032529 A1 Feb. 10, 2005

Related U.S. Application Data

(63) Continuation of application No. PCT/JP02/02516, filed on Mar. 15, 2002.

(51) Int. Cl.
*H04Q 7/20* (2006.01)

(52) U.S. Cl. ............... 455/456.2; 455/456.1; 455/414.1; 455/41.2; 455/500; 455/518; 455/519; 455/520

(58) Field of Classification Search .. 455/456.1–456.2, 455/414.1, 41.2, 500, 518–520
See application file for complete search history.

(56) References Cited

U.S. PATENT DOCUMENTS

| | | | |
|---|---|---|---|
| 6,836,667 B1 * | 12/2004 | Smith, Jr. ............... | 455/456.1 |
| 2001/0014911 A1 | 8/2001 | Doi et al. ................ | 709/221 |
| 2001/0055392 A1 | 12/2001 | McDonnell et al. ..... | 380/258 |
| 2002/0004399 A1 | 1/2002 | McDonnell et al. ..... | 455/456 |
| 2002/0054150 A1 | 5/2002 | I'Anson et al. ......... | 345/810 |

FOREIGN PATENT DOCUMENTS

| | | |
|---|---|---|
| EP | 1126732 A2 | 8/2001 |
| EP | 1139681 A2 | 10/2001 |
| EP | 1139687 A2 | 10/2001 |
| EP | 1139688 A2 | 10/2001 |
| JP | HEI 9-322253 | 12/1997 |
| JP | HEI 11-282863 | 10/1999 |
| JP | 2000-69542 | 3/2000 |
| JP | 2000-156883 | 6/2000 |
| JP | 2000-292182 | 10/2000 |
| JP | 2001-224055 | 8/2001 |
| JP | 2001-229497 | 8/2001 |
| JP | 2001-320759 | 11/2001 |
| JP | 2001-320760 | 11/2001 |
| JP | 2001-325175 | 11/2001 |
| JP | 2001-359169 | 12/2001 |

* cited by examiner

*Primary Examiner*—Lester G. Kincaid
*Assistant Examiner*—Nicholas La
(74) *Attorney, Agent, or Firm*—Staas & Halsey LLP

(57) ABSTRACT

In a positional information providing method, an information sending server transmits desired decision positional information and unique information on a designated mobile terminal device to a positional information providing server, and a mobile terminal device transmits unique information thereon to the positional information providing server, and when the designated unique information and the unique information agree with each other, the positional information providing server makes a decision as to whether or not there is a point of agreement between the decision positional information and the positional information on the mobile terminal device and, when the decision indicates that there is a point of agreement between the decision positional information and the positional information on the mobile terminal device, the positional information providing server notifies the decision result through a network to the information sending server, thereby providing the positional information.

10 Claims, 11 Drawing Sheets

FIG. 5

DECISION CONDITION MANAGEMENT TABLE

| INFORMATION SENDING SERVER ID NUMBER |
|---|
| DECISION POSITIONAL INFORMATION |
| DESIGNATED UE NUMBER |

FIG. 6
GTMSI MANAGEMENT TABLE

| GTMSI NUMBER |
| --- |
| POSITION REGISTRATION INFORMATION |
| GROUP REGISTRATION UE NUMBER 1 |
| GROUP REGISTRATION UE NUMBER 2 |
| GROUP REGISTRATION UE NUMBER 3 |
| ⋮ |
| GROUP REGISTRATION UE NUMBER n |

POSITIONAL INFORMATION PROVIDING METHOD AND POSITIONAL INFORMATION PROVIDING SYSTEM

This application is a continuing application, filed under 35 U.S.C. §111(a), of International Application PCT/JP02/02516, filed Mar. 15, 2002.

TECHNICAL FIELD

The present invention relates to a positional information providing method and positional information providing system suitable for use when offering positional information on a mobile terminal device (for example, portable telephone) to a server of an information provider (third party) which, for example, provides information such as advertisement, and further to a positional information providing server, information sending server and terminal device, which constitute the same system, coupled with an information providing method and information providing system.

BACKGROUND ART

In recent years, along with the ubiquitous mobile terminal devices such as portable telephone and PHS (Personal Handyphone System), there has appeared an information providing service for offering information such as advertisement to the mobile terminal devices. The requirement arising with such an information providing service involves an information offer using positional information on a person who possesses the mobile terminal device for accepting the information offer.

On the other hand, in the case of the mobile terminal devices such as portable telephone and PHS, there is a need to get hold of the present position of a mobile terminal device at all times for calling the mobile terminal device wherever the possessor of the portable terminal device is. Therefore, a mobile terminal device carrier such as portable telephone carrier or PHS carrier manages positional information on mobile terminal devices at all times while registering it in a position registering apparatus. That is, an area number indicative of a position registered area (paging area) is broadcased from a base station toward mobile terminal devices at all times, and a mobile terminal device periodically collates an area number stored in its storage unit with the currently broadcased area number to, in the case of no coincidence therebetween, make a request for the renewal of the position registration to the position registering apparatus, thereby managing the positional information on the mobile terminal device at all times.

In particular, in the case of the PHS, because one base station covers a small area, it is considered to offer an information providing service through the use of the positional information on PHS managed by a position registering apparatus. That is, whenever the positional information on the PHS is renewed in the position registering apparatus, the positional information is notified to an information sending server run by a third party other than the PHS carrier. On the other hand, it is considered that the information sending server makes a decision, on the basis of the positional information transmitted from the position registering apparatus, as to whether or not the PHS possessor enters a specific area, and sends the latest information (for example, advertisement, or the like) specializing in this area toward the PHS existing in the specific area, thereby realizing an information providing service through the use of the positional information on the PHS.

In addition, a portable telephone equipped with a GPS (Global Positioning System) function has recently appeared and, hence, an information providing service utilizing accurate positional information acquired through the GPS function is expectable in the future.

In this case, the following arrangement is conceivable.

That is, as shown in FIG. 10, each portable telephone 100 periodically measures a position thereof through the use of the GPS function, and transmits, in a constant cycle, the measured positional information through abase station 102 and an exchange 103, which constitute a mobile communication network 101, to a position registering apparatus 104 designed to manage the positional information on each portable telephone 100. Moreover, the positional information registering apparatus 104 is made to notify new positional information to an information sending server 105 run by a third party other than the portable telephone carrier whenever the renewal of the position registration is made on the basis of the positional information transmitted from each portable telephone 100. Moreover, on the basis of the positional information transmitted from the position registering apparatus 104 at every renewal of the position registration, the information sending server 105 makes a decision as to whether or not a person who carries the portable telephone 100 gets into a specific area, and transmits the latest information (for example, advertisement or the like) specialized in this area toward the portable telephone getting into the specific area.

Meanwhile, the positional information on a mobile terminal device is indicative of the location of the mobile terminal device possessor and is privacy information of the mobile terminal device possessor and, hence, this information requires extremely great protection.

For this reason, a mobile terminal device carrier such as a portable telephone carrier or PHS carrier is required to take a proper measure to protect the privacy of the mobile terminal device possessor when, for example, offering the positional information on the mobile terminal device to a third party. Moreover, this similarly applies to even a case in which a positional information provider other than the mobile terminal device carrier offers positional information on a mobile terminal device.

In addition, a third party which carries on an information sending server which receives the offer of the positional information on a mobile terminal device is also required to take a proper measure for the protection of the privacy of the mobile terminal device possessor.

However, in fact, a third party running an information sending server does not always take a proper measure, and it is uncaclulated to take a proper measure.

For example, in a case in which an information sending server run by a third party is not designed as a high-security system, there is a possibility that the positional information on a mobile terminal device leaks out, and difficulty is experienced in realizing the protection of privacy of a person (subscriber) who possesses a mobile terminal device.

In particular, in a case in which the positional information on a mobile terminal device is transmitted through the internet to an information sending server, there is another possibility of the positional information on the mobile terminal device leaking out on the internet.

Still additionally, even in a case in which a mobile terminal device possessor makes a registration for receiving the information offer using positional information thereon from an information sending server run by a third party, if the positional information on the mobile terminal device leaks from the information sending server and is used for purposes other than the information offer the mobile terminal device possessor intends originally, the protection of the privacy of the mobile terminal device possessor becomes unfeasible.

Yet additionally, as shown in FIG. 11, in a case in which an information sending server 105 run by a third party is made to acquire the positional information on a specified portable telephone (mobile terminal device) 100 from a position registering apparatus 104 at a constant cycle, the moving route of the possessor of the portable telephone 100 is made clear in the information sending server 105. In this case, if the moving route of the possessor of the portable telephone 100 leaks from the information sending server toward another server 106, there is a possibility of chase and abuse. Thus, the chase/abuse of the positional information on the portable telephone 100 can lead to the invasion of the privacy of the possessor of the portable telephone 100.

DISCLOSURE OF INVENTION

The present invention has been developed in consideration of the above-mentioned problems, and is therefore an object of the invention to provide a positional information providing method and positional information providing system and further to provide a positional information providing server, information sending server and terminal device, which constitute the same system, coupled with an information providing method and information providing system, capable of realizing an information providing service using the positional information on a mobile terminal device by providing the positional information on the mobile terminal device while protecting the privacy of the possessor of the mobile terminal device.

For achieving this purpose, a positional information providing method according to the present invention is configured to provide positional information on a desired mobile terminal device to an information sending server through the use of a positional information providing server connected through a network to the information sending server, and is included a position decision request step in which the information sending server transmits desired decision positional information and unique information on a designated mobile terminal device through the network to the positional information providing server, a registration step in which a mobile terminal device transmits unique information thereon through the network to the positional information providing server, a position decision step in which, when the designated unique information and the unique information agree with each other, the positional information providing server makes a decision as to whether or not there is a point of agreement between the decision positional information and positional information on the mobile terminal device, and a positional information providing step in which, when the decision shows that there is a point of agreement between the decision positional information and the positional information on the mobile terminal device, the positional information providing server notifies the decision result through the network to the information sending server for providing positional information.

In particular, preferably, there is included a positional information registration step in which a specified terminal device existing in a short-distance radio-communicable range with respect to the mobile terminal device transmits group identification information to be used for grouping mobile terminal devices existing in the short-distance radio-communicable range and positional information thereon through the network to the positional information providing server so that, in the registration step, the mobile terminal device receives the group identification information transmitted from the specified terminal device through the short-distance radio communication unit and transmits the group identification information and unique information thereon through the network to the positional information providing server for conducting group registration, and in the position decision step, when the designated unique information and the unique information agree with each other, the positional information providing server makes a decision as to whether or not there is a point of agreement between the decision positional information and the positional information on the specified terminal device, and in the positional information providing step, when the decision shows that there is a point of agreement between the decision positional information and the positional information on the specified terminal device, the positional information providing server notifies the decision result through the network to the information sending server for providing the positional information.

In addition, a positional information providing system according to the present invention is configured to provide positional information on a desired mobile terminal device to an information sending server through the use of a positional information providing server connected through a network to the information sending server, and the information sending server is configured to transmit desired decision positional information and unique information on a designated mobile terminal device through the network to the positional information providing server, and a mobile terminal device is configured to transmit unique information thereon through the network to the positional information providing server, and the positional information providing server is configured to, when the designated unique information and the unique information agree with each other, make a decision as to whether or not there is a point of agreement between the decision positional information and positional information on the mobile terminal device and, when the decision shows that there is a point of agreement between the decision positional information and the positional information on the mobile terminal device, the positional information providing server notifies the decision result through the network to the information sending server for providing positional information.

In particular, preferably, a specified terminal device, existing in a short-distance radio-communicable range with respect to the mobile terminal device, configured to transmit group identification information to be used for grouping mobile terminal devices existing in the short-distance radio-communicable range and positional information thereon through the network to the positional information providing server wherein the mobile terminal device is configured to receive the group identification information transmitted from the specified terminal device through the short-distance radio communication unit and transmits the group identification information and unique information thereon through the network to the positional information providing server, and the positional information providing server is configured to, when the designated unique information and the unique information agree with each other, make a decision as to whether or not there is a point of agreement between the decision positional information and the positional information on the specified terminal device, and the positional information providing server is configured to, when the decision shows that there is a point of agreement between the decision positional information and the positional information on the specified terminal device, notify the decision result through the network to the information sending server for providing the positional information.

With the positional information providing method and the positional information providing system according to the present invention thus configured, the positional information on the mobile terminal device is not transmitted to the information sending server and the positional information providing server.

Therefore, the leakage of the positional information on a person who possesses a mobile terminal device is preventable, which protects the privacy of the mobile terminal device possessor. In particular, since the positional information on a mobile terminal device is not transmitted to the information sending server whenever the position of a person who possesses the mobile terminal device varies, it is possible to prevent the abuse of the positional information on the mobile terminal device such as chasing the mobile terminal device possessor, thereby achieving the protection of the privacy of the mobile terminal device possessor. Meanwhile, the information sending server receives only the information (decision result) needed for transmitting information to the mobile terminal device possessor and provides the information corresponding to the position of the mobile terminal device.

In particular, preferably, in a case in which the specified terminal device is a vehicle-mounted terminal device placed in public transportation facility and the mobile terminal device possessor takes a ride in the public transportation facility, the mobile terminal device is configured to receive the group identification information transmitted from the vehicle-mounted terminal device through the short-distance radio communication unit and to transmit the group identification information and unique information thereon through the network to the positional information providing server.

With this arrangement, even in a case in which the mobile terminal device possessor moves by taking the public transportation facility, the position decision is made through the use of the positional information on the public transportation facility which does not lead to a privacy issue, thus enabling the protection of the privacy of the mobile terminal device possessor.

Furthermore, an information providing method according to the present invention is configured to provide information to a desired mobile terminal device upon consideration of positional information through the use of a positional information providing server connected through a network to an information sending server, and is included a position decision request step in which the information sending server transmits desired decision positional information and unique information on a designated mobile terminal device through the network to the positional information providing server, a position decision step in which the positional information providing server reads out positional information on the designated mobile terminal device on the basis of the unique information to make a decision as to whether or not there is a point of agreement between the decision positional information and the positional information on the designated mobile terminal device and, when the decision shows that there is a point of agreement therebetween, notifies the decision result through the network to the information sending server, and an information providing step in which, in response to the notification of the decision result, the information sending server transmits information corresponding to a position of the designated mobile terminal device through the network to the designated mobile terminal device.

Still furthermore, an information providing system according to the present invention is configured to provide information to a desired mobile terminal device upon consideration of positional information through the use of a positional information providing server connected through a network to an information sending server, and is included the information sending server is configured to transmit desired decision positional information and unique information on a designated mobile terminal device through the network to the positional information providing server, and the positional information providing server is configured to read out positional information on the designated mobile terminal device on the basis of the unique information for making a decision as to whether or not there is a point of agreement between the decision positional information and the positional information on the designated mobile terminal device and, when the decision shows that there is a point of agreement therebetween, notify the decision result through the network to the information sending server, and the information sending server is configured to, in response to the notification of the decision result, transmit information corresponding to a position of the designated mobile terminal device through the network to the designated mobile terminal device.

In the information providing method and the information providing system according to the present invention thus configured, the positional information on the mobile terminal device is not transmitted to the information sending server.

Therefore, the leakage of the positional information on a person who possesses a mobile terminal device is preventable, which protects the privacy of the mobile terminal device possessor. In particular, since the positional information on a mobile terminal device is not transmitted to the information sending server whenever the position of a person who possesses the mobile terminal device varies, it is possible to prevent the abuse of the positional information on the mobile terminal device such as chasing the mobile terminal device possessor, thereby achieving the protection of the privacy of the mobile terminal device possessor. Meanwhile, the information sending server receives only the information (decision result) needed for transmitting information to the mobile terminal device possessor and provides the information corresponding to the position of the mobile terminal device.

Yet furthermore, a positional information providing server according to the present invention is connected through a network to an information sending server to provide positional information on a desired mobile terminal device to the information sending server and is included a decision condition storing unit configured to store desired decision positional information and unique information on a designated mobile terminal device in a state associated with each other, an information storing unit configured to store unique information and positional information on a mobile terminal device in a state associated with each other, and a position decision unit, configured to make a decision as to whether or not there is a point of agreement between the decision positional information stored in the decision condition storing unit and the positional information on the mobile terminal device stored in the information storing unit, when the designated unique information stored in the decision condition storing unit and the unique information stored in the information storing unit agree with each other, and when the decision shows that there is a point of agreement between the decision positional information and the positional information on the mobile terminal device, the position decision unit notifies the decision result through the network to the information sending server for providing positional information.

In particular, preferably, the information storing unit is a group information storing unit configured to store unique information on each mobile terminal device, group identification information to be used for grouping mobile terminal devices existing in a short-distance radio-communicable range with respect to a specified terminal device and positional information on the specified terminal device in a state associated with each other, and the position decision unit is configured to, when the designated unique information stored in the decision condition storing unit and the unique information stored in the group information storing unit agree with each other, make a decision as to whether or not there is a point of agreement between the decision positional information stored in the decision condition storing unit and the positional information on the specified terminal device stored in the group information storing unit and, when the decision shows that there is a point of agreement between the decision positional information and the positional information on the specified terminal device, notifies the decision result through the network to the information sending server or providing positional information.

In particular, preferably, included therein are a decision condition managing unit, configured to store the decision positional information and the designated unique information in the decision condition storing unit in a state associated with each other, when the decision positional information and the designated unique information are transmitted from the information sending server, and a group information managing unit configured to carry out position registration processing in which, when the group identification information and the positional information are transmitted from the specified terminal device, the group identification information and the positional information are stored in the group information storing unit in a state associated with each other and further configured to carry out group registration processing in which, when the group identification information and the unique information are transmitted from the mobile terminal device, the group identification information and the unique information are stored in the group information storing unit in a state associated with each other.

Moreover, preferably, the group information managing unit deletes the unique information stored in the group information storing unit to cancel the group registration when receiving, from the mobile terminal device, a notification to the effect that a reception level of an electric wave used for short-distance radio communication with respect to the specified terminal device falls below a predetermined level.

In addition, a positional information providing method according to the present invention is configured to provide positional information on a desired mobile terminal device to an information sending server in a state connected through a network to the information sending server, and is included a decision condition registration step of, when desired decision positional information and unique information on a designated mobile terminal device are transmitted from the information sending server, storing the decision positional information and the designated unique information in the decision condition storing unit in a state associated with each other, a registration step of, when unique information and positional information are transmitted from a mobile terminal device, storing the unique information and the positional information in an information storing unit in a state associated with each other, a position decision step of, when the designated unique information stored in the decision condition storing unit and the unique information stored in the information storing unit agree with each other, making a decision as to whether or not there is a point of agreement between the decision positional information stored in the decision condition storing unit and the positional information on the mobile terminal device stored in the information storing unit, and a positional information providing step of, when the decision in the position decision step shows that there is a point of agreement between the decision positional information and the positional information on the mobile terminal device, notifying the decision result through the network to the information sending server for providing positional information.

In particular, preferably, included therein is a positional information registration step of, when group identification information to be used for grouping mobile terminal devices existing in a short-distance radio-communicable range and positional information are transmitted from a specified terminal device, storing the group identification information and the positional information in the information storing unit in a state associated with each other, the registration step is configured as a group registration step of, when the group identification information and the unique information are transmitted from each mobile terminal device, storing the group identification information and the unique information in the information storing unit for group registration, and the position decision step is configured to, when the designated unique information stored in the decision condition storing unit and the unique information stored in the information storing unit agree with each other, make a decision as to whether or not there is a point of agreement between the decision positional information stored in the decision condition storing unit and the positional information on the specified terminal device stored in the information storing unit, and the positional information providing step being arranged to, when the decision in the position decision step shows that there is a point of agreement between the decision positional information and the positional information on the specified terminal device, notify the decision result through the network to the information sending server for providing positional information.

In addition, an information sending server according to the present invention is connected through a network to a positional information providing server to provide information through the use of positional information on a desired mobile terminal device, and is included a position decision request processing unit configured to transmit desired decision positional information and unique information on a designated mobile terminal device through the network to the positional information providing server for making a request for a position decision, and an information sending processing unit, configured to send information corresponding to a position of the designated mobile terminal device to the designated mobile terminal device, when receiving the position decision result from the positional information providing server.

Still additionally, a terminal device according to the present invention is a terminal device to be used as the specified terminal device in the above-described positional information providing system, and is included basic radio communication unit configured to receive information from the information sending server and short-distance radio communication unit configured to make short-distance radio communication with respect to a mobile terminal device existing in a short-distance radio-communicable range, configured to transmit group identification information to be used for grouping mobile terminal devices existing in the short-distance radio-communicable range to a short-distance radio-communicable mobile terminal device.

In particular, preferably, the basic radio communication unit includes a positional information transmission processing unit configured to transmit positional information to a server configured to manage positional information on mobile terminal devices, and the positional information transmission processing unit is configured to transmit the group identification information together with positional information.

Yet additionally, a terminal device according to the present invention is a terminal device to be used as the mobile terminal device in the above-described positional information providing system, and is included basic radio communication unit configured to receive information from the information sending server, and configured to transmit the group identification information and unique information thereon, and short-distance radio communication unit configured to make short-distance radio communication with respect to the specified terminal devices, and configured to receive group identification information to be used for grouping mobile terminal devices existing in a short-distance radio-communicable range with respect to the specified terminal device.

BRIEF DESCRIPTION OF DRAWINGS

FIG. 5 is an illustration of one example of a decision condition management table to be managed in a positional information providing server constituting the positional information providing system according to the embodiment of the present invention.

FIG. 6 is an illustration of one example of a group information management table (GTMSI management table) to be managed in a positional information providing server constituting the positional information providing system according to the embodiment of the present invention.

BEST MODE FOR CARRYING OUT THE INVENTION

Referring to FIGS. 1 to 9, a description will be given hereinbelow of a positional information providing system and positional information providing method, and of a positional information managing server, positional information providing server, information sending server and terminal device, which constitute the same system, coupled with an information providing system and information providing method, according to an embodiment of the present invention.

First of all, referring to FIG. 8, a description will be given of the outline of an information providing service to be realized through the use of the positional information providing system (including the information providing system) according to this embodiment.

Figure 8:
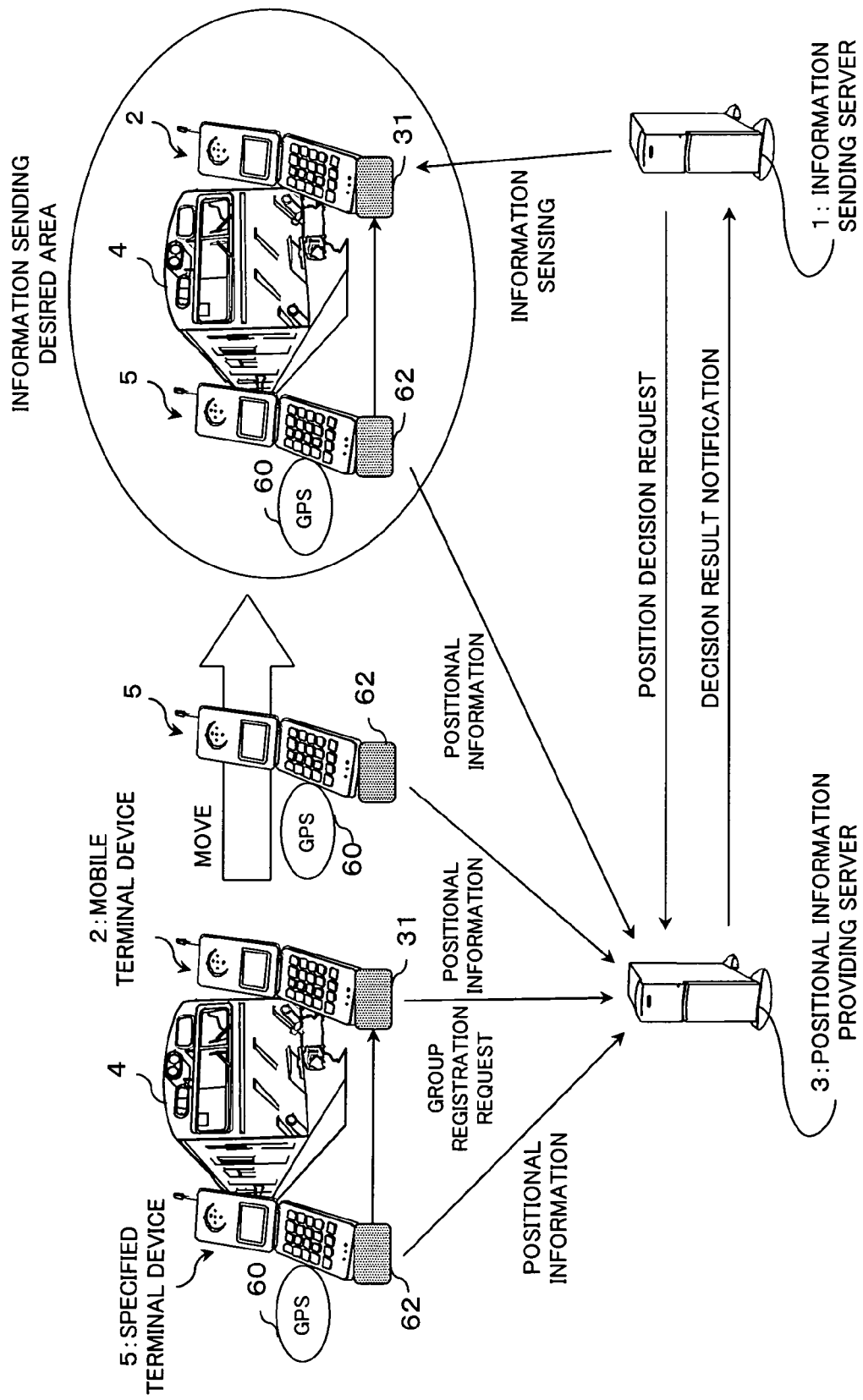
FIG. 8 is an illustrative view for explaining the outline of an information providing service to be realized through the use of the positional information providing system according to the embodiment of the present invention.

First, as shown in FIG. 8, an information sending server 1 makes a request to a positional information providing server 3 for making a decision as to whether or not a mobile terminal device (for example, a portable telephone, or the like) 2, which is to provide information, gets in an information sending desired area in which it desires sending information (position decision request).

Moreover, in a case in which, for example, a person carrying the mobile terminal device 2 rides in a public transportation facility (which will be referred to hereinafter as a train or the like) 4 such as train or bus, since the mobile terminal device 2 moves with a specified terminal device 5 so as to enable grouping the mobile terminal device 2 and the specified terminal device 5, group identification information (GTMSI number) to be used for grouping mobile terminal device 2 existing in an area enabling short-distance radio communication with respect to the specified terminal device 5 is transmitted from the specified terminal device (specified mobile terminal device, vehicle-mounted terminal device, for example, Box type terminal device) 5, installed in the train or the like 4, to the mobile terminal device 2 the person riding in the train or the like 4 possesses. Upon receipt of the group identification information, the mobile terminal device 2 transmits the group identification information to the positional information providing server 3 to make a request for group registration (group registration request).

On the other hand, the positional information providing server 3 takes in the positional information on the specified terminal device 5 as needed when the train or the like 4 moves and makes a decision as to whether or not the person who possesses the mobile terminal device 2 comes in the information sending desired area (position decision). If the decision result indicates that it comes in the information sending desired area, the positional information providing server 3 notifies the decision result to the information sending server 1 (in-area notification).

Thus, instead of the positional information on the mobile terminal device, the position decision is made through the use of the positional information on the specified terminal device 5 representing the group, which can prevent the leakage or abuse of the positional information on the mobile terminal device, thereby protecting the privacy of the mobile terminal device possessor.

In addition, upon receipt of the in-area notification from the positional information providing server 3, the information sending server 1 sends information corresponding to the area to the mobile terminal device 2.

As described above, with this positional information providing system, the positional information on the mobile terminal device is provided within a range needed for providing, for example, information such as advertisement, which enables not only protecting the privacy of the person (user, subscriber) having the mobile terminal device such as a portable telephone but also realizing an area-based information providing service for providing area information corresponding to the present position of the mobile terminal device possessor.

Referring to FIGS. 1 to 9, a description will be given hereinbelow of the positional information providing system (including an information providing system) according to this embodiment.

Figure 1:
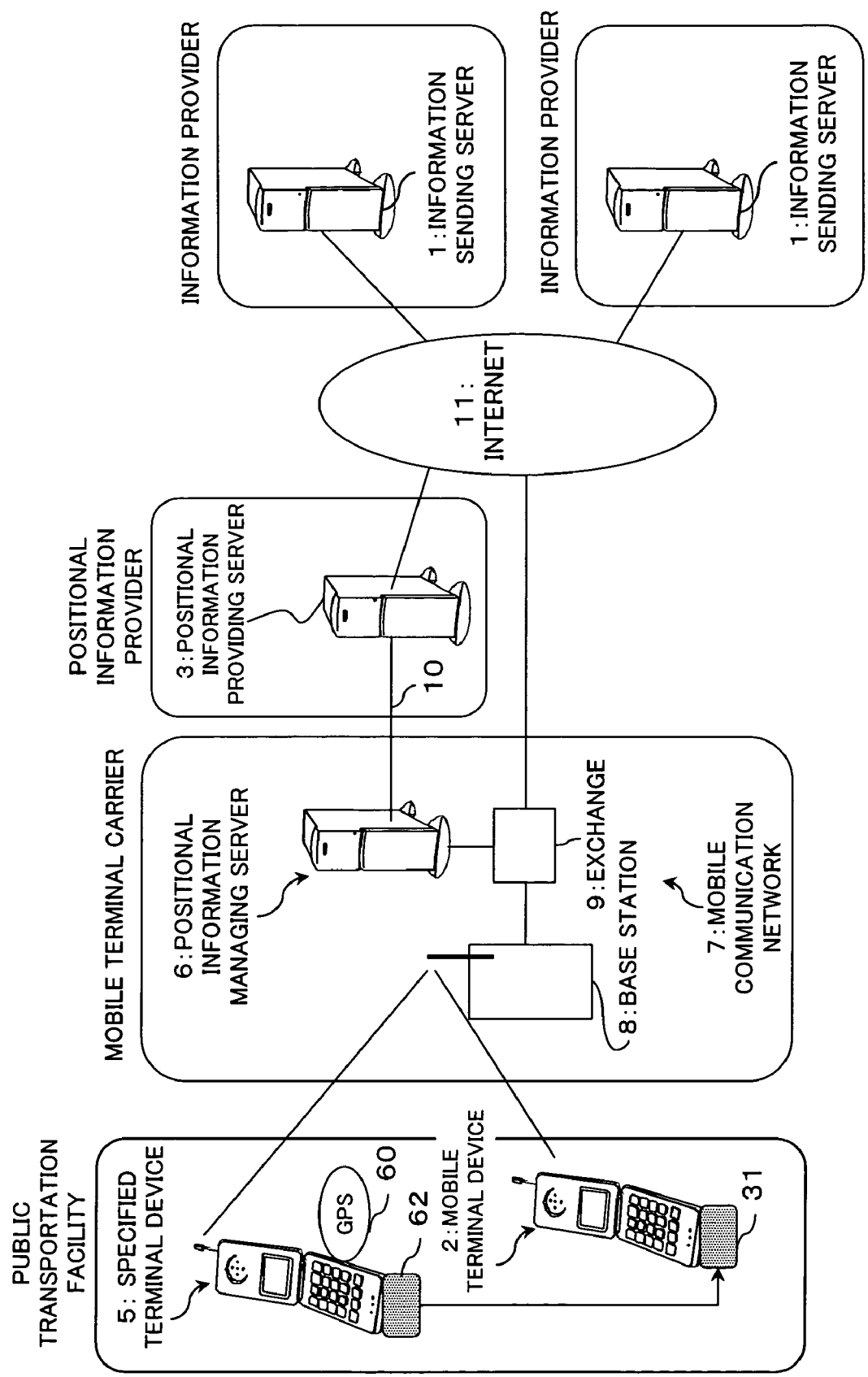
FIG. 1 is an illustrative view showing the entire configuration of a positional information providing system according to an embodiment of the present invention.

As FIG. 1 shows, this positional information providing system is made up of a positional information managing server 6 located in a mobile terminal device carrier such as a portable telephone carrier or a PHS carrier, a positional information providing server (positional information decision server) 3 located in a positional information provider, an information sending server 1 located in an information provider, a specified terminal device (for example, a Box type terminal device) 5 located in a public transportation facility (which will be referred to hereinafter as a train or the like) 4 such as train or bus, and a mobile terminal device (for example, a portable telephone or the like) 2 an individual possesses. The positional information providing server 3 and the information sending server 1 constitute an information providing system.

In addition, as FIG. 1 shows, the mobile terminal device 2 and the specified terminal device 5 are connected through a base station 8 and an exchange 9, located in a mobile communication network (network) 7, to the positional information managing server 6, and the positional information providing server 3 is connected through a dedicated line (network) 10 to the positional information managing server 6. These positional information managing server 6 and positional information providing server 3 are constructed as a high-security system so as to prevent the leakage of the positional information on the mobile terminal device 2. Moreover, since the positional information providing server 3 is connected through the dedicated line 10 to the positional information managing server 6, the prevention of leakage of the positional information on the mobile terminal device 2 is achievable when the positional information on the mobile terminal device 2 is transmitted from the positional information managing server 6 to the positional information providing server 3.

Still additionally, as FIG. 1 shows, the mobile communication network 7 is connected through a non-shown gateway to the internet (network) 11. Yet additionally, to the internet 11, there are connected the positional information providing server 3 and a plurality of information sending servers 1.

Thus, the plurality of information sending servers 1 are connected through the networks such as the mobile communication network 7 and the internet 11 to the mobile terminal device 2. Moreover, they are made to acquire the positional information on the mobile terminal device 2 through the positional information managing server 6 and the positional information providing server 3. This enables transmitting the information (area information) corresponding to the present position of the person carrying the mobile terminal device 2 to the mobile terminal device 2 while protecting the privacy of the person possessing the mobile terminal device 2.

In this case, the specified terminal device (representative terminal device) 5 has a function (basic radio communication unit, mobile communication radio equipment) to transmit and receive electric waves in a mobile communication band through the mobile communication network 7 and a function (short-distance radio communication unit, short-distance radio communication radio equipment) to transmit and receive weak electric waves in a band different from the mobile communication band according to a short-distance radio communication protocol [for example, Bluetooth (registered trademark), radio LAN such as IEEE802.11b, IrDA utilizing infrared rays, and others] for making radio data communications.

Figure 2:
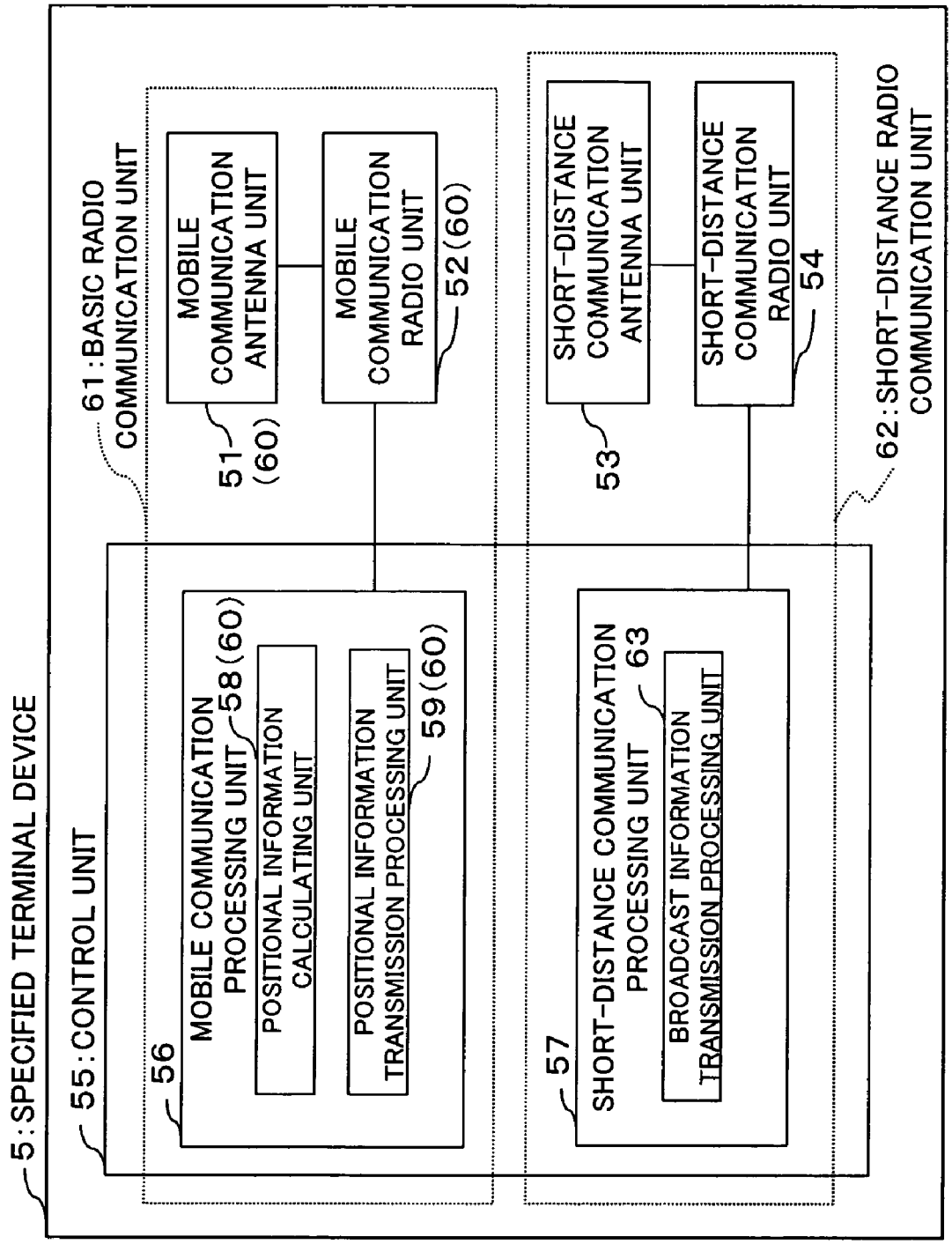
FIG. 2 is a block diagram showing a configuration of a specified terminal device device constituting the positional information providing system according to the embodiment of the present invention.

That is, as shown in FIG. 2, the specified terminal device 5 is made up of an antenna unit 51 for mobile communication and a radio unit 52 for mobile communication, which are for carrying out the transmission/reception of an electric wave in a mobile communication band through the mobile communication network 7, an antenna unit 53 for short-distance radio communication and a radio unit 54 for short-distance radio communication, which are for conducting the transmission/reception of a weak electric wave according to a short-distance radio communication protocol, and a control unit 55 including a CPU, a memory and others for implementing various processing by carrying out various types of programs.

In this case, as shown in FIG. 2, the control unit 55 is composed of a mobile communication processing unit 56 for processing a signal (data) transmitted/received through the mobile communication antenna unit 51 and the mobile communication radio unit 52, and a short-distance radio communication processing unit 57 for processing a signal (data) transmitted/received through the short-distance radio communication antenna 53 and the short-distance radio-communication radio unit 54.

As FIG. 2 shows, the mobile communication antenna unit 51, the mobile communication radio unit 52 and the mobile communication processing unit 56 of the control unit 55 organize a basic radio communication unit (mobile communication radio equipment) 61. Moreover, the short-distance radio communication antenna unit 53, the short-distance radio-communication radio unit 54 and the short-distance radio communication processing unit 57 of the control unit 55 organize a short-distance radio communication unit (short-distance radio communication radio equipment) 62.

Furthermore, the specified terminal device 5 according to this embodiment has a function (GPS function, GPS equipment) to receive information from a plurality of GPS satellites for calculating a position (for example, longitude, latitude) thereof.

That is, according to this embodiment, the mobile communication antenna unit 51 and the mobile communication radio unit 52 of the specified terminal device 5 function as a GPS antenna unit and a GPS receiver so that the information from the plurality of satellites are receivable. Moreover, as shown in FIG. 2, the mobile communication processing unit 56 of the specified terminal device 5 includes a positional information calculating unit 58 for calculating GPS information (positional information; for example, information such as longitude and latitude) indicative of the position of the specified terminal device 5 on the basis of the information from the GPS satellites, and a positional information transmission processing unit 59 for carrying out the processing for the transmission of the GPS information calculated in the positional information calculating unit 58 through the mobile communication network 7 to the positonal information managing server 6. Therefore, the mobile communication antenna unit 51, the mobile communication radio unit 52 and the positional information calculating unit 58 and the positonal information transmission processing unit 59 of the mobile communication processing unit 56 are referred to as a GPS equipment 60.

Incidentally, the specified terminal device 5 can also be equipped with, in addition to the mobile communication antenna unit 51 and the mobile communication radio unit 52, a GPS antenna unit and a GPS receiver (GPS radio unit).

Moreover, in this case, although the specified terminal device 5 is equipped with the GPS equipment 60 and is made to calculate the GPS information (positional information), the present invention is not limited to this. For example, it is also appropriate that the information from the GPS satellites, received by the specified terminal device 5, is transmitted to the positional information managing server 6 so that the positional information managing server 6 calculates the positional information (GPS information; for example, information such as longitude and latitude) on the basis of the information from the GPS satellites. Still moreover, it is also appropriate that the base station 8 calculates the positional information (GPS information) on the specified terminal device 5 through the use of the information from the GPS satellites received by the specified terminal device 5 and the calculated positional information (GPS information) is transmitted to the positional information managing server 6.

In particular, according to this embodiment, when the positional information (GPS information) is transmitted to the positional information managing server 6, the positional information transmission processing unit 59 add thereto a group temporary mobile terminal device identifier [group identification information; which will hereinafter be referred to as GTMSI (GTMSI number)] to be used for grouping mobile terminal device 2 existing in a range enabling short-distance radio communication with respect to the specified terminal device 5. As the GTMSI, a different group temporary mobile terminal device identifier for each specified terminal device 5 is stored in a memory.

On the other hand, as shown in FIG. 2, the short-distance radio communication processing unit 57 includes a broadcast information transmission processing unit (GTMSI transmission processing unit, group information transmission processing unit) 63 to carry out the processing for transmitting broadcast information including the GTMSI to the mobile terminal device 2 existing in the short-distance radio-communicable range with respect to the specified terminal device 5 according to a broadcast protocol of a short-distance radio communication protocol.

Figure 3:
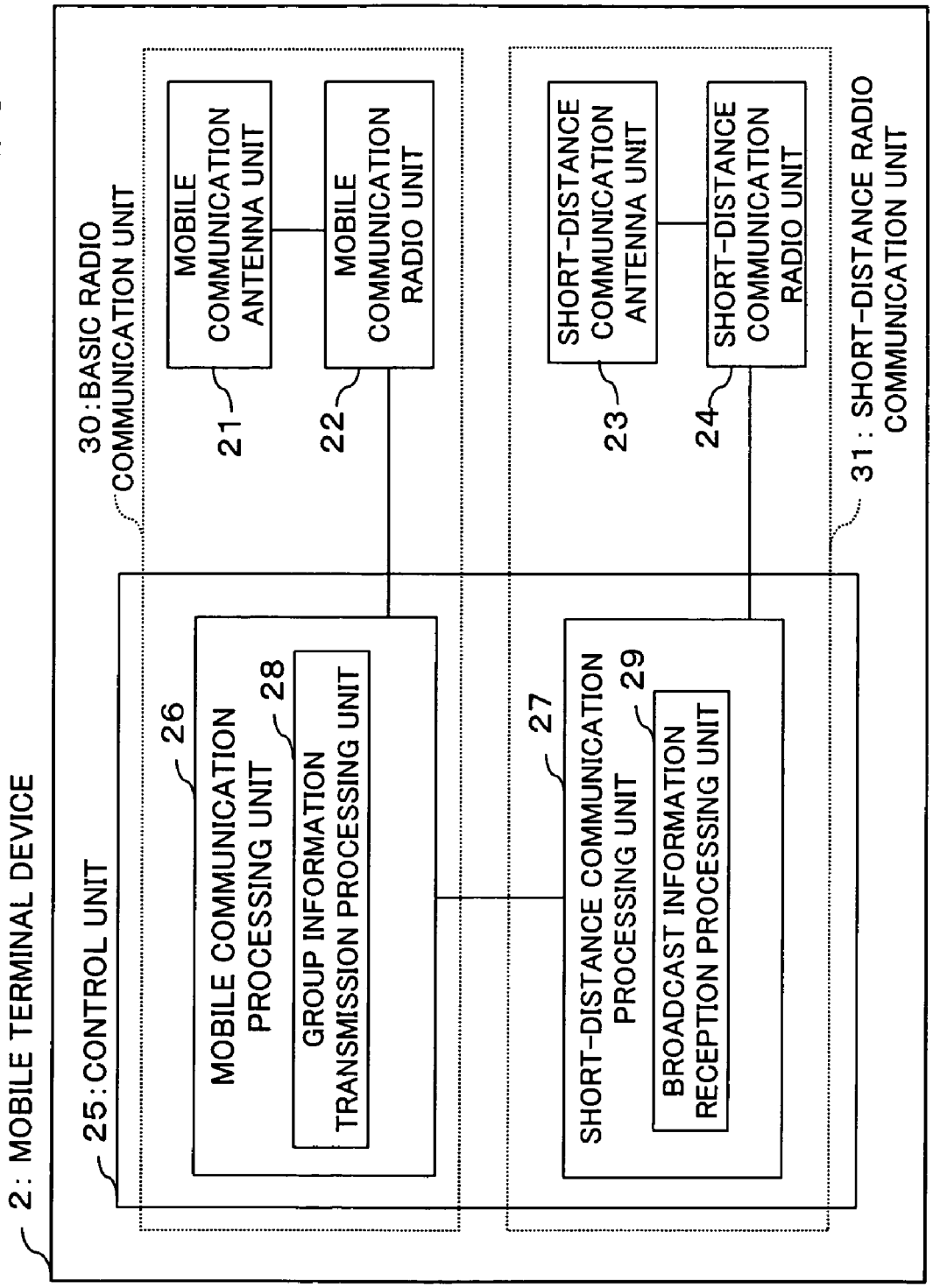
FIG. 3 is a block diagram showing a configuration of a mobile terminal device constituting the positional information providing system according to the embodiment of the present invention.

As shown in FIG. 3, the mobile terminal device 2 is equipped with a function (basic radio communication unit, mobile communication radio equipment) to transmit and receive an electric wave in a mobile communication band through the mobile communication network 7 for carrying out the radio data communications and a function (short-distance radio communication unit, short-distance radio communication radio equipment) to transmit and receive a weak electric wave in a band different from the mobile communication band according to a short-distance radio communication protocol [for example, Bluetooth (registered trademark), radio LAN such as IEEE802.11b, IrDA utilizing infrared rays, and others] for carrying out radio data communications.

That is, as shown in FIG. 3, the mobile terminal device 2 is made up of a mobile communication antenna unit 21 and a mobile communication radio unit 22, which are for performing the transmission/reception of an electric wave in a mobile communication band through the mobile communication network 7, a short-distance radio communication antenna unit 23 and a short-distance radio-communication radio unit 24, which are for conducting the transmission/reception of a weak electric wave according to a short-distance radio communication protocol, and a control unit 25 including a CPU, a memory and others for implementing various types of programs to carry out various processing.

In this case, as shown in FIG. 3, the control unit 25 is composed of a mobile communication processing unit 26 for processing a signal (data) transmitted/received through the mobile communication antenna unit 21 and the mobile communication radio unit 22, and a short-distance radio communication processing unit 27 for processing a signal (data) transmitted/received through the short-distance radio communication antenna unit 23 and the short-distance radio-communication radio unit 24.

As FIG. 3 shows, the mobile communication antenna unit 21, the mobile communication radio unit 22 and the mobile communication processing unit 26 of the control unit 25 constitute a basic radio communication unit(mobile communication radio equipment) 30. Moreover, the short-distance radio communication antenna unit 23, the short-distance radio-communication radio unit 24 and the short-distance radio communication processing unit 27 of the control unit 25 constitute a short-distance radio communication unit (short-distance radio communication radio equipment) 31.

In particular, according to this embodiment, as shown in FIG. 3, the short-distance radio communication processing unit 27 is equipped with a broadcast information reception processing unit (GTMSI reception processing unit, group information reception processing unit) 29 which receives the broadcast information including the GTMSI, transmitted from the aforesaid specified terminal device 5, according to the broadcast protocol of the short-distance radio communication protocol and puts it in a memory of the mobile terminal device 2.

On the other hand, the mobile communication processing unit 26 is equipped with a group information transmission processing unit 28 which conducts the processing (which is referred to as a group registration request) for, when the reception level of the broadcast information received by the broadcast information reception processing unit 29 exceeds a predetermined level, transmitting the GTMSI (group information) together with unique information (for example, address information such as an electronic mail address or a PUSH data transmission address, needed for transmitting information to the mobile terminal device 2; which will hereinafter be referred to equally as a UE number), capable of specifying the mobile terminal device 2, through the mobile communication network 7 to the positional information managing server 6.

In addition, the group information transmission processing unit 28 monitors the reception level of the broadcast information from the specified terminal device 5 in the mobile terminal device 2 and conducts the processing (which is referred to as a group registration cancellation request) for, when the reception level falls below a predetermined level, transmitting the GTMSI together with the UE number of the mobile terminal device 2 through the mobile communication network 7 to the positional information managing server 6.

Figure 4:
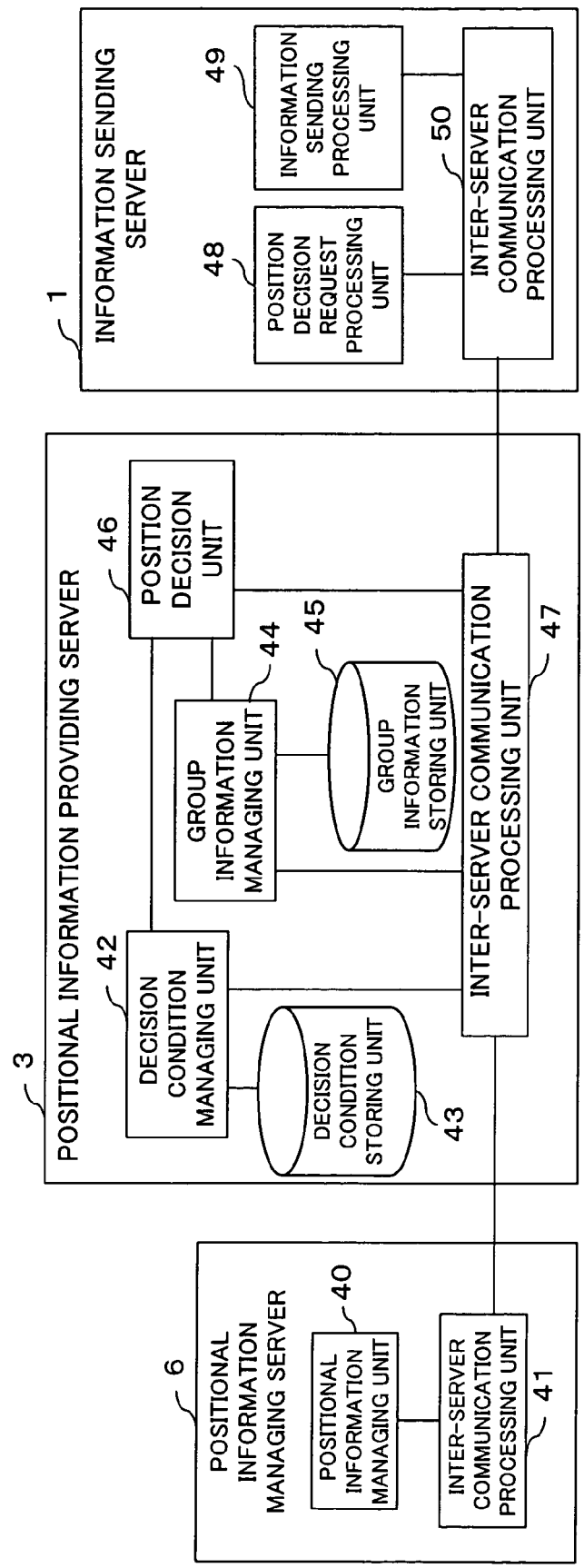
FIG. 4 is a block diagram showing configurations of a positional information managing server, a positional information providing server and an information sending server constituting the positional information providing system according to the embodiment of the present invention.

Meanwhile, as shown in FIG. 4, the positional information managing server (mobile terminal device carrier computer) 6 is composed of a positional information managing unit 40 for managing the positional information (GPS information) and the GTMSI transmitted from the specified terminal device 5 through the mobile communication network 7, and an inter-server communication processing unit 41 acting as an interface to conduct the processing for the transmission/reception of data to/from another server.

In this case, the positional information managing server 6 is equipped with a control arithmetic unit including a CPU, a memory and others and a storage unit such as a hard disk. Moreover, the function of the positional information managing unit 40 is realized in a manner such that the CPU implements a predetermined program to conduct the processing (positional information registration processing, positional information renewal processing) for storing the positional information (GPS information) and the GTMSI in the storage unit in a state associated with each other.

Incidentally, although in this embodiment the positional information to be managed in the positional information managing server 6 is GPS information, the present invention is not limited to this. For example, it is also appropriate that the positional information on the specified terminal device 5 is obtained through the use of navigation information other than the GPS information, reception levels of an electric wave from the specified terminal device 5 in a plurality of base stations 8, statistical information or the like and the specified terminal device 5 positional information thus obtained is managed in the positional information managing server 6. In a case in which the GPS information is not used as the positional information, the specified terminal device 5 can be made so as not to have the GPS function.

For example, as the positional information to be managed in the positional information managing server 6, it is also possible to employ positional information [mobile terminal device ID and position registration area information (base station ID or the like) corresponding thereto] to be registered and managed for enabling the transmission/reception of data in the mobile terminal device 2 such as a portable telephone. In this case, the mobile terminal device 2 transmits its own ID and GTMSI to the positional information managing server 6 so that position registration area information (base station ID or the like) is read out on the basis of the ID of the mobile terminal device 2 to obtain the positional information on the mobile terminal device 2 on the basis of this positional registration area information, with the obtained positional information and the GTMSI being transmitted to the positional information providing server 3.

As FIG. 4 shows, the positional information providing server (positional information provider computer) 3 is made up of a decision condition managing unit 42, a decision condition storing unit 43, a group information managing unit 44, a group information storing unit (information storing unit) 45, a position decision unit 46, and an inter-server communication processing unit 47 serving as an interface to conduct the processing for the transmission/reception of data to/from another server.

The positional information providing server 3 is composed of a control arithmetic unit including a CPU, a memory and others and a storage unit such as a hard disk. The functions of the decision condition managing unit 42, the group information managing unit 44 and the position decision unit 46 are realized in a manner such that the CPU carries out a predetermined program.

In this case, the decision condition managing unit 42 is for managing a decision condition transmitted from the information sending server 1 through, for example, the internet 11.

As the information to be transmitted as the decision condition, for example, there are decision positional information such as information sending desired area information for specifying an information sending desired area or positional information for specifying, as a point, a specific place in an information sending desired area, unique information (for example, address information such as electronic mail address or PUSH data transmission address needed for transmitting information to a mobile terminal device; which will hereinafter be referred to equally as a designated UE number) capable of specifying a designated mobile terminal device which is to send information, identification information (ID number, identification number) on the information sending server 1, and others.

Concretely, when a decision condition is transmitted from the information sending server 1, the decision condition managing unit 42 puts the decision condition in the decision condition storing unit 43, thereby conducting the decision condition registration processing.

The decision condition storing unit 43 stores the ID number of the information sending server 1, the decision positional information and the designated UE number in a state associated with each other and manages them in the form of a decision position management table shown in FIG. 5.

The group information managing unit 44 is made to associate the positional information (GPS information) on the specified terminal device 5 transmitted from the positional information managing unit 40 of the positional information managing server 6 through, for example, the dedicated line 10 with the UE number transmitted from the mobile terminal device 2 through the use of the GTMSI and manage them as group information.

Concretely, the positional information (GPS information; position registration information) on the specified terminal device 5 and the GTMSI stored in a storage unit of the positional information managing server 6 are transmitted whenever the positional information (GPS information) on the specified terminal device 5 managed by the positional information managing unit 40 of the positional information managing server 6 is newly registered or renewed, and the group information managing unit 44 puts the transmitted positional information (GPS information; position registration information) on the specified terminal device 5 and GTMSI in the group information storing unit 45 in a state associated with each other, thereby conducting the processing (positional information registration processing) for registering the positional information (GPS information; position registration information) on the specified terminal device 5.

Furthermore, in a case in which the mobile terminal device 2 receives the GTMSI from the specified terminal device 5 (that is, when the reception level of the broadcast information exceeds a predetermined level), since the GTMSI and the UE number are transmitted from the mobile terminal device 2 through the mobile communication network 7, the group information managing unit 44 puts the transmitted GTMSI and UE number in the group information storing unit 45 in a state associated with each other, thereby conducting the processing (group registration processing, position group registration processing) for the group registration.

The group information storing unit 45 stores the GTMSI (GTMSI number), the positional information (GPS information; position registration information) and the UE number in a state associated with each other, and manages them in the form of a GTMSI management table (group information management table) shown in FIG. 6.

On the other hand, in a case in which the reception level of the broadcast information from the specified terminal device 5 falls below the predetermined level, since the GTMSI and the UE number are transmitted from the mobile terminal device 2 through the mobile communication network 7, the group information managing unit 44 removes the UE number, registered in a state associated with the GTMSI, from the GTMSI management table, thereby conducting the group registration cancellation processing (group registration cancellation processing).

As described above, according to this embodiment, the group information managing unit 44 of the positional information providing server 3 manages the positional information (GPS information; position registration information) on the specified terminal device 5 and the UE number of the mobile terminal device 2 in a state associated with the GTMSI for grouping the specified terminal device 5 and the group-registered mobile terminal device 2 so that the positional information (GPS information; position registration information) on the specified mobile terminal device 5 can be used as the positional information on the mobile terminal device 2.

Thus, the renewal of the positional information on individual (plural) mobile terminal device 2 belonging to a group is made by renewing the positional information on the specified terminal device 5 so as to inhibit the positional information on the individual mobile terminal device 2 belonging to the group, from being released to the positional information providing server 3, thereby preventing the positional information on the individual mobile terminal device 2 from leaking.

When the aforesaid group registration processing or positional information registration (renewal) processing is conducted, the position decision unit 46 reads out the decision positional information from the decision condition management table stored in the decision condition storing unit 43 and further reads out the positional information (GPS information; position registration information) on the specified terminal device 5 from the GTMSI management table stored in the group information storing unit 45 to make a decision as to whether or not there is a point of agreement (overlapping point) between the positional information (GPS information; position registration information) on the specified terminal device 5 and the decision positional information.

In addition, when making a decision that there is a point of agreement between the positional information (GPS information; position registration information) on the specified terminal device 5 and the decision positional information, the position decision unit 46 notifies the decision result to the information sending server 1. For example, in a case in which the information sending server 1 is a server located in a local shopping mall and only one area information is delivered, only the UE number can be transmitted as the decision result. For example, in a case in which the decision positional information is area information including a predetermined region, the notification of the decision result signifies the notification of the fact that the mobile terminal device 2 gets in an area specified by the decision positional information and, hence, it is equally referred to as in-area notification.

As shown in FIG. 4, the information sending server 1 (information provider computer) 1 is composed of a position decision request processing unit 48, an information sending processing unit 49 and a inter-server communication processing unit 50 acting as an interface to conduct the processing for the transmission/reception of data with respect to another server.

The information sending server 1 is composed of a control arithmetic unit including a CPU, a memory and others, and a storage unit such as a hard disk. Moreover, the functions of the position decision request processing unit 48 and the information sending processing unit 49 are realized in a manner such that the CPU carries out a predetermined program.

In this configuration, the position decision request processing unit 48 is for conducting the processing (which is referred to as a position decision request) for transmitting a decision condition such as decision positional information, designated UE number or ID number of the information sending server 1 through, for example, the internet 11 to the positional information providing server 3.

The information sending processing unit 49 is for, when receiving the notification on the decision result from the positional information providing server 3, conducting the processing for transmitting information (for example, advertisement or the like) through the mobile communication network 7 to the mobile terminal device 2.

In this case, the information sending processing unit 49 is made to automatically transmit (PUSH type information delivery) the information such as advertisement as PUSH data to the mobile terminal device 2. That is, without requesting the information from the mobile terminal device 2 side, the information is unilaterally transmitted from the information sending server 1 side and is displayed on the mobile terminal device 2. The information sending server 1 can also transmit the information such as advertisement through the use of the electronic mail address of the mobile terminal device 2 by means of an electronic mail.

In this connection, a person who wants acquiring the information (for example, gourmet information, town information, news, weather forecast, or the like) corresponding to the positional information on the mobile terminal device 2, notifies, to a third party running the information sending server 1, the information (for example, electronic mail address, PUSH data transmission address, or the like) needed for transmitting information to the mobile terminal device 2 and unique information (UE number) capable of specifying the mobile terminal device 2, thereby making the user registration.

Figure 7:
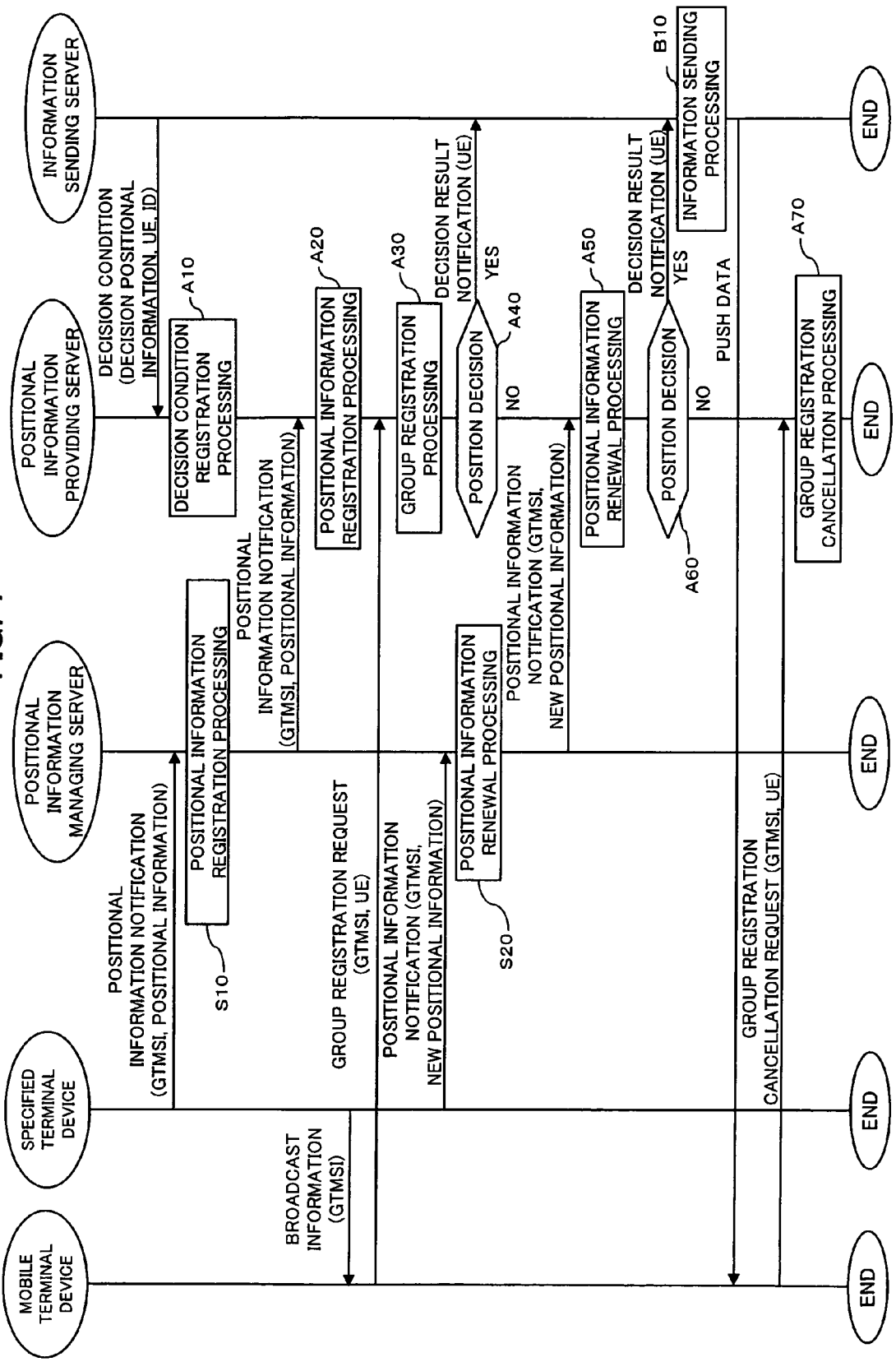
FIG. 7 is a flow chart for explaining information providing processing (information providing method) including positional information providing processing to be conducted in the positional information providing system according to the embodiment of the present invention.

Referring to FIG. 7, a description will be given hereinbelow of a positional information providing method based on the positional information providing system configured as described above.

As shown in the flow chart of FIG. 7, first, the position decision request processing unit 48 of the information sending server 1 transmits, to the positional information providing server 3, the decision condition (such as decision positional information or designated UE number, ID number of the information sending server 1 (position decision request, decision condition registration request, see FIG. 8).

Upon receipt of the positional decision request (decision condition registration request) from the information sending server 1, the decision condition managing unit 42 of the positional information providing server 3 conducts the processing for storing the decision positional information and the designated UE number in the decision condition storing unit 43 in a state associated with each other (decision condition registration processing; step A10).

Meanwhile, the positional information calculating unit 58 (mobile communication processing unit 56) of the specified terminal device (terminal device on which the positonal information can be opened to the public) 5 installed in the public transportation facility 4 such as train or bus calculates the positional information (GPS information) on the specified terminal device 5. Moreover, the positional information transmission processing unit 59 (mobile communication processing unit 56) of the specified terminal device 5 transmits the positional information (GPS information) on the specified terminal device 5 together with a group temporary mobile terminal device identifier (GTMSI) through the mobile communication network 7 to the positional information managing server 6 (positional information notification, see FIG. 8).

When receiving the positional information notification from the specified terminal device 5, the positional information managing unit 40 of the positional information managing server 6 conducts the processing for associating the GTMSI and the positional information (GPS information) on the specified terminal device 5 and storing them in a non-shown storage unit (positional information registration processing; step S10).

When the positional information registration processing in which the positional information (GPS information; position registration information) on the specified terminal device 5 and the GTMSI are associated and stored is conducted in this way, the positional information managing unit 40 of the positional information managing server 6 transmits the GTSMI and the positional information (GPS information; position registration information) on the specified terminal device 5 through, for example, a network such as the dedicated line 10 to the positional information providing server 3 (position information notification).

Upon receipt of the positional information notification from the positional information managing server 6, the group information managing unit 44 of the positional information providing server 3 conducts the processing for associating the GTMSI and the positional information (GPS information; position registration information) on the specified terminal device 5 and for storing them in the group information storing unit 45 (positional information registration processing; step A20).

Meanwhile, the broadcast information transmission processing unit 63 (short-distance radio communication processing unit 57) of the specified terminal device 5 transmits the broadcast information including the GTMSI to the mobile terminal device(s) 2 existing in a short-distance radio-communicable range according to a broadcast protocol of a short-distance radio communication protocol (see FIG. 8).

On the other hand, the broadcast information reception processing unit 29 (short-distance radio communication processing unit 27) of the mobile terminal device 2 receives the broadcast information including the GTMSI transmitted from the specified terminal device 5. Moreover, when a person who possesses the mobile terminal device 2 manipulates the mobile terminal device 2, the group information transmission processing unit 28 (mobile communication processing unit 26) of the mobile terminal device 2 transmits the GTMSI and the UE number through the mobile communication network 7 or, for example, a network such as the dedicated line 10 to the positional information providing server 3 (group registration request, see FIG. 8).

For example, a person who possesses the mobile terminal device 2 having the short-distance radio communication function takes a ride on the public transportation facility 4 on which the specified terminal device 5 is installed, the mobile terminal device 2 receives the GTMSI broadcasted from the specified terminal device 5 and transmits the received GTMSI and the UE number to the positional information providing server 3.

When receiving the group registration request from the mobile terminal device 2, the group information managing unit 44 of the positional information providing server 3 conducts the processing for associating and registering the GTMSI and the UE number (group registration processing, position group registration processing; step A30, group registration step, registration step).

When the group registration processing is conducted in this way, the position decision unit 46 of the positional information providing server 3 reads out the decision positional information from the decision condition managing table stored in the decision condition storing unit 43 and further reads out the positional information (GPS information; position registration information) on the specified terminal device 5 from the GTMSI managing table stored in the group information storing unit 45 and makes a decision as to whether or not there is a point of agreement between the decision positional information and the positional information (GPS information) on the specified terminal device (step A40).

Thus, the positional information on the specified terminal device 5, to which the GTMSI is given, is monitored and the decision is made as to whether or not there is a point of agreement between the positional information (GPS information) on the specified terminal device 5 and the decision positional information, thereby making a decision as to whether or not there is a point of agreement between the positional information on the individual (plural) mobile terminal device 2 group-registered in a state associated with the GTMSI and the decision positional information.

When the decision result in the position decision unit 46 of the positional information providing server 3 indicates that there is a point of agreement between the decision position information and the positional information (GPS information) on the specified terminal device 5 (YES route), the position decision unit 46 of the positional information providing server 3 notifies the decision result through, for example a network such as the internet 11 to the information sending server 1.

For example, if the decision positional information is area information, the decision result to be notified is indicative of the presence of the mobile terminal device 2 in the area and, hence, the position decision unit 46 of the positional information providing server 3 makes the in-area notification to the information sending server 1.

When receiving the decision result notification from the positional information providing server 3 in this way, the information sending processing unit 49 of the information sending server 1 transmits (example: PUSH) information (for example, information specialized in the corresponding area, or the like) related to the corresponding decision positional information through, for example, a network such as the internet 11 or the mobile communication network 7 to the mobile terminal device 2 (information sending processing; step B10).

On the other hand, if the decision in the position decision unit 46 of the positional information providing server 3 in the aforesaid step A40 indicates that there is no point of agreement between the decision positional information and the positional information (GPS information) on the specified terminal device 5 (NO route), the position decision unit 46 of the positional information providing server 3 continues to monitor the positional information (positional information on the specified terminal device 5) on the group to which the designated UE number belongs, without notifying the decision result to the information sending server 1 (see FIG. 8).

Following this, the positional information calculating unit 58 (mobile communication processing unit 56) of the specified terminal device 5 calculates the positional information (GPS information) on the specified terminal device 5 and, in the case of the acquisition of the positional information (GPS information) different from the positional information (GPS information) at the previous calculation, the positional information transmission processing unit 59 (mobile communication processing unit 56) of the specified terminal device 5 transmits new positional information (GPS information) together with a group temporary mobile terminal device identifier (GTMSI) through the mobile communication network 7 to the positional information managing server 6 (new positional information notification, see FIG. 8).

Upon receipt of the new positional information notification from the specified terminal device 5, the positional information managing unit 40 of the positional information managing server 6 puts the new positional information (GPS information) on the specified terminal device 5 in a non-shown storage unit to conduct the processing for renewing the position registration information, registered as the positional information on the specified terminal device 5, to the new positional information (GPS information) (positional information renewal processing; step S20).

When the positional information renewal processing for renewing the position registration information on the specified terminal device 5 is conducted in this way, the positional information managing unit 40 of the positional information managing server 6 transmits the GTSMI and the new positional information (GPS information) on the specified terminal device 5 through, for example, a network such as the dedicated line 10 to the positional information providing server 3 (new positional information notification).

Upon receipt of the new positional information notification from the positional information managing server 6, the group information managing unit 44 of the positional information providing server 3 puts the new positional information (GPS information) on the specified terminal device 5 in the group information storing unit 45 for carrying out the processing to renew the position registration information on the specified terminal device 5 to the new positional information (GPS information) (positional information renewal processing; step A50).

When the positional information renewal processing is conducted in this way, the position decision unit 46 of the positional information providing server 3 reads out the decision positional information from the decision condition managing table stored in the decision condition storing unit 43 and further reads out the new positional information (GPS information) on the specified terminal device 5 from the GTMSI stored in the group information storing unit 45 for making a decision as to whether or not there is a point of agreement between the decision positional information and the new positional information (GPS information) on the specified terminal device 5 (step A60).

When the decision result in the position decision unit 46 of the positional information providing server 3 indicates that there is a point of agreement between the decision positional information and the new positional information (GPS information) on the specified terminal device 5 (YES route), the position decision unit 46 of the positional information providing server 3 notifies the decision result through, for example, a network such as the internet 11 to the information sending server 1 (see FIG. 8).

For example, if the decision positional information is area information, the decision result to be notified is indicative of the existence of the mobile terminal device 2 in an area and, hence, the position decision unit 46 of the positional information providing server 3 makes the in-area notification to the information sending server 1.

In this case, the decision as to whether or not a person carrying the mobile terminal device 2 desiring the position decision comes into a desired area (decision position) is made through the use of the positional information on the specified terminal device 5 placed in the public transportation facility 4, and the decision result is notified to the information sending server 1, which can inhibit the positional information on the mobile terminal device 2 from being opened to the public, thereby achieving the protection of privacy of the mobile terminal device 2 possessor.

Thus, when receiving the decision result notification from the positional information providing server 3, the information sending processing unit 49 of the information sending server 1 transmits (example: PUSH) information (for example, information specialized in the corresponding area, or the like) related to the corresponding decision positional information through, for example, a network such as the internet 11 or the mobile communication network 7 to the mobile terminal device 2 (information sending processing; step B10, see FIG. 8).

On the other hand, if the decision in the position decision unit 46 of the positional information providing server 3 in the aforesaid step A60 indicates that there is no point of agreement between the decision positional information and the new positional information (GPS information) on the specified terminal device 5 (NO route), the position decision unit 46 of the positional information providing server 3 continuously monitor the positional information (positional information on the specified terminal device 5) on the group to which the designated UE number pertains, without notifying the decision result to the information sending server 1. Following this, the similar processing is repeatedly conducted.

Meanwhile, the broadcast information reception processing unit 29 of the mobile terminal device 2 monitors the reception level of the broadcast information from the specified terminal device 5 and, when the reception level falls below a predetermined level, transmits the GTMSI and the UE number through the mobile communication network 7 to the positional information providing server 3 for making a group registration cancellation request.

On the other hand, the group information managing unit 44 of the positional information providing server 3 removes the corresponding UE number from the GTMSI management table stored in the group information storing unit 45, thereby conducting the processing for the group registration cancellation (group registration cancellation processing; step A70, group registration cancellation step). Incidentally, when the person possessing the mobile terminal device 2 takes a ride on the public transportation facility 4 in which another specified terminal device 5 is placed, the group registration is again made.

With the positional information providing system and positional information providing method, and the positional information managing server, positional information providing server, information sending server and terminal device for use in the same system, coupled with the information providing system and information providing method, without undergoing the invasion of privacy, a large number of people having the mobile terminal device 2 taking a ride on the public transportation facility 4 can receive an information providing service through the use of the positional information on the public transportation facility 4 which does not require paying attention to the privacy.

Figure 9:
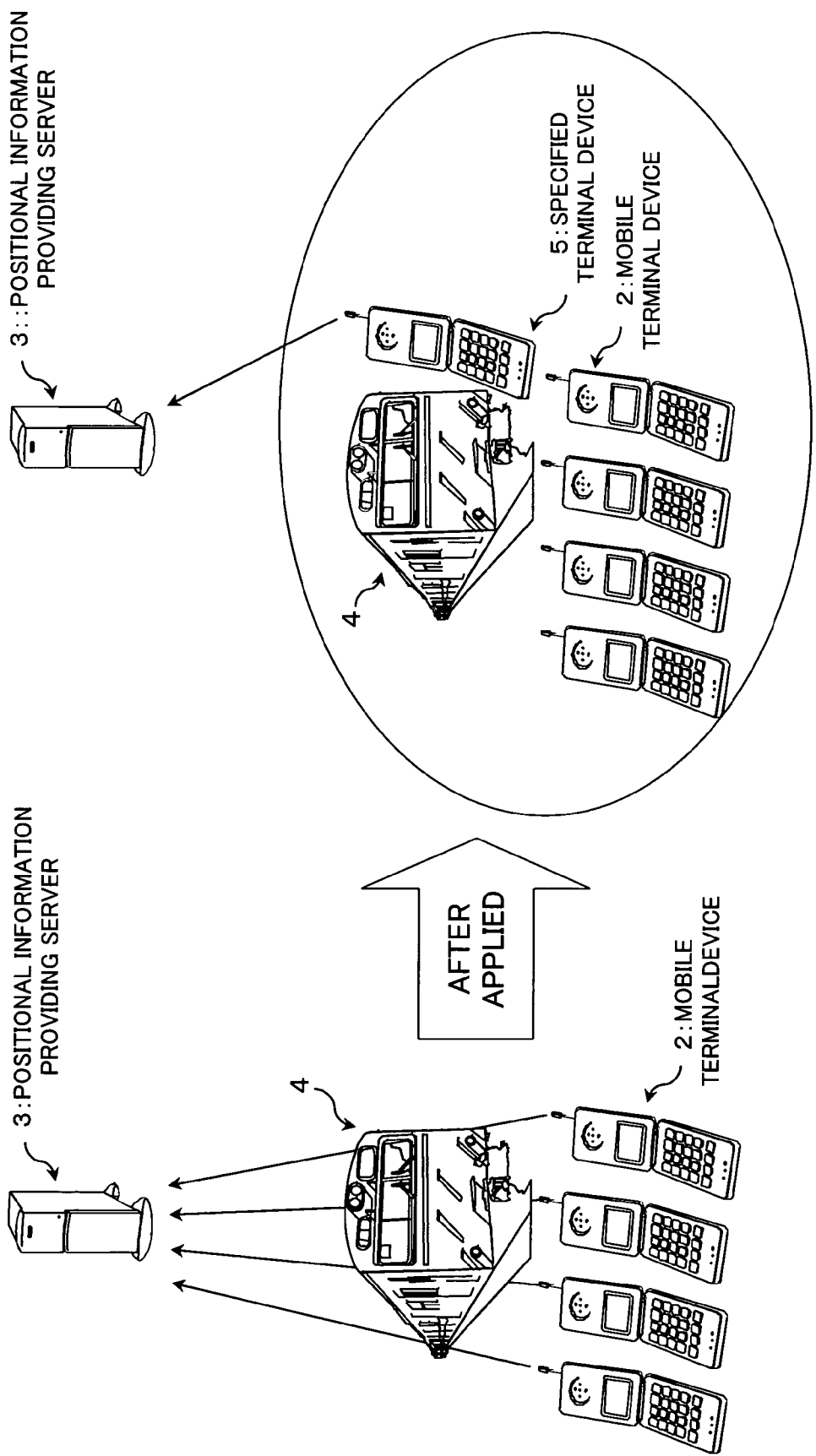
FIG. 9 is an illustrative view for explaining the effects of the positional information providing system according to the embodiment of the present invention.
Figure 10:
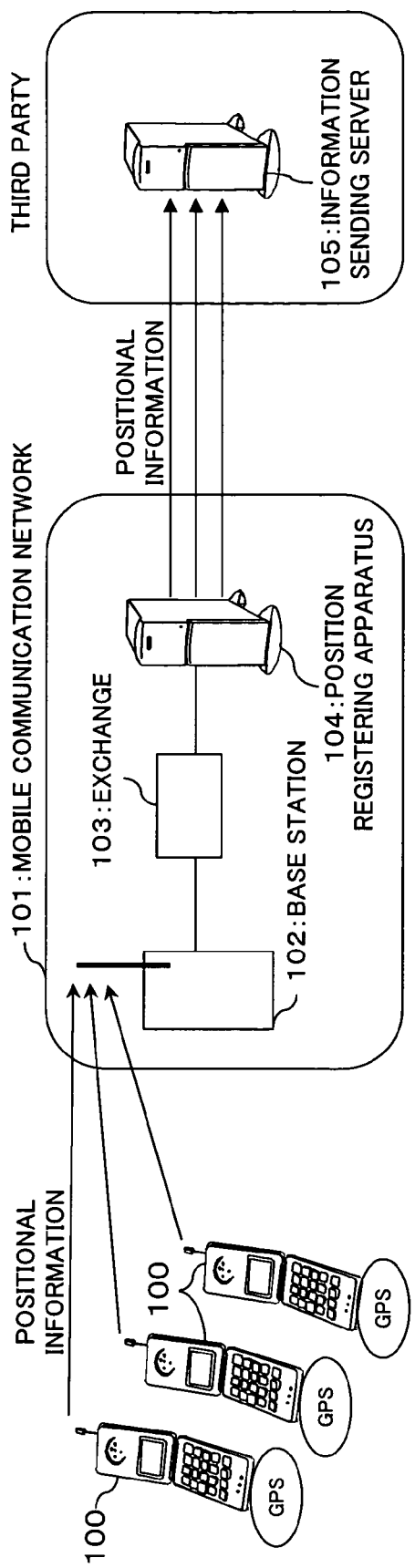
FIG. 10 is an illustrative view for explaining a configuration considered in the case of providing information through the use of positional information on a mobile terminal device.
Figure 11:
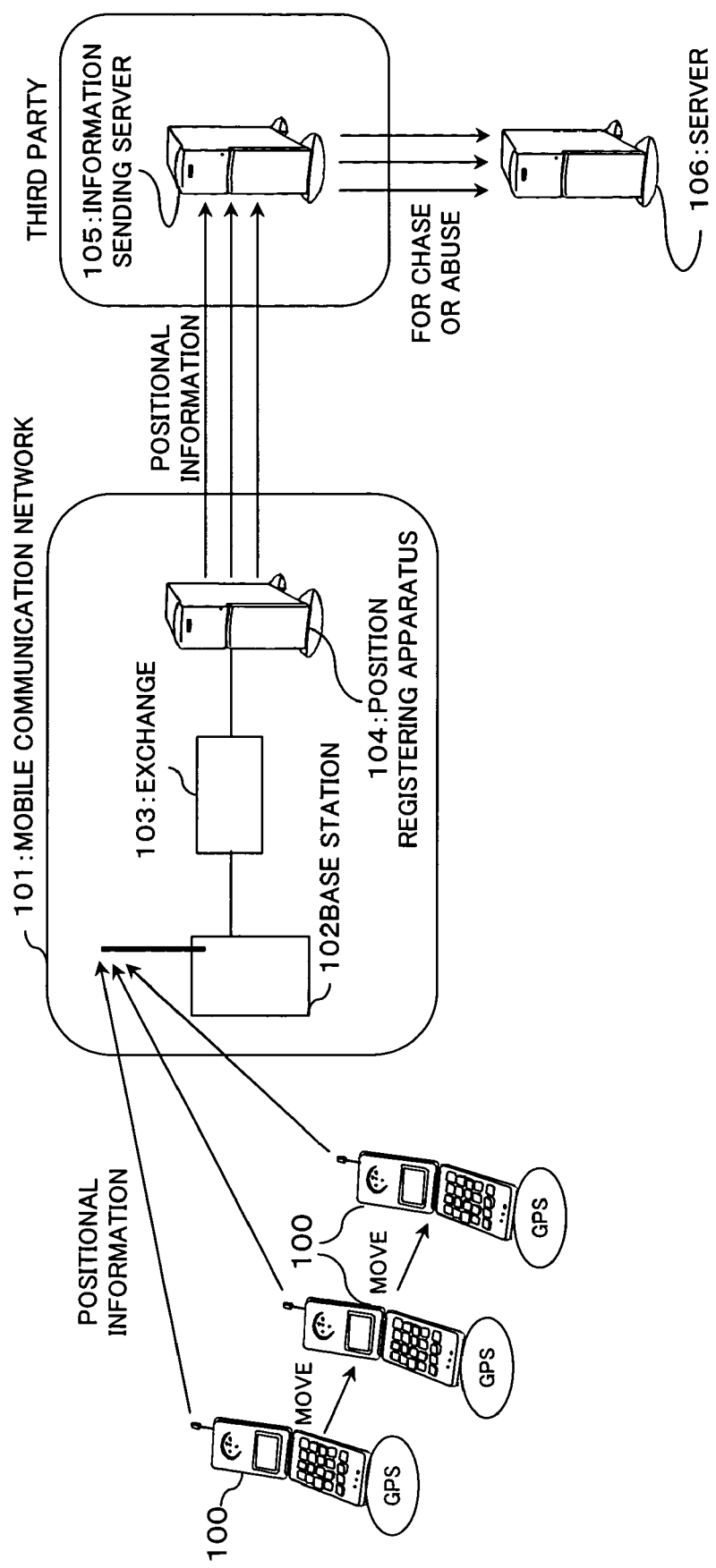
FIG. 11 is an illustrative view for explaining the objects of a configuration assumed in the case of providing information through the use of positional information on a mobile terminal device.

In addition, as shown in FIG. 9, since only the positional information on the specified terminal device 5 is transmitted to the positional information providing server 3, in comparison with the case of transmitting it together with the positional information on the mobile terminal device 2, the server load is reducible. Still additionally, attention can be paid to the notification of only the positional information on the specified terminal device 5 and there is no need to consider the instantaneous maximum processing for the notification of the positional information on the mobile terminal device 2 possessed by a person who is taking a ride on the public transportation facility 4 and moving therewith, which can hold the cost to a low value.

Incidentally, although in this embodiment, as described above, the positional information managing server 6 and the positional information providing server 3 are constructed by a high-security system and these servers are connected through the dedicated line (network) 10 to preventing the leakage of the positional information on the mobile terminal device 2, the present invention is not limited to this. That is, according to this embodiment, as mentioned above, only the positional information on the specified terminal device 5 is transmitted to the positional information providing server 3 and the positional information on the individual mobile terminal device 2 is not transmitted thereto and, hence, the positional information managing server 6 and the positional information providing server 3 can also be connected to each other through, for example, a network such as the internet. Also in this configuration, the leakage of the positional information on the mobile terminal device 2 is preventable.

In addition, although in the above-described embodiment the positional information managing server 6 and the positional information providing server 3 are independently constructed as a server run by a mobile terminal device carrier and a server run by a positional information provider, respectively, the present invention is not limited to this. For example, it is also appropriate that the positional information managing server 6 and the positional information providing server 3 are run by one of a mobile terminal device carrier and a positional information provider.

Still additionally, although in the above-described embodiment the positional information providing system is made to include an information providing system, it is also possible that only the information providing system is taken out as follows.

That is, an information providing system made to offer information taking positional information into consideration to a desired mobile terminal device is constructed through the use of the positional information providing server 3 connected through a network to the information sending server 1. Concretely, the information sending server 1 is made to transmit desired decision positional information and unique information on a designated mobile terminal device through a network to the positional information providing server 3. Moreover, the positional information providing server 3 is made to read out the positional information on the designated mobile terminal device 2 on the basis of the unique information to make a decision as to whether or not there is a point of agreement between the decision positional information and the positional information on the designated mobile terminal device 2 and, if there is a point of agreement therebetween, notify the decision result through the network to the information sending server 1. Still moreover, the information sending server 1 is made to, when receiving the notification of the decision result, transmit the information corresponding to the position of the designated mobile terminal device 2 through the network to the designated mobile terminal device 2.

The processing (information providing method) for the information offer in the information providing system thus constructed comprises the following steps.

That is, the processing comprises a position decision request step in which the information sending server 1 transmits desired decision positional information and unique information on a designated mobile terminal device through a network to the positional information providing server 3, a position decision step in which the positional information providing server 3 reads out the positional information on the designated mobile terminal device 2 on the basis of the unique information to make a decision as to whether there is a point of agreement between the decision positional information and the positional information on the designated mobile terminal device 2 and, when the decision indicates that there is a point of agreement therebetween, notifies the decision result through the network to the information sending server 1, and an information providing step in which, when receiving the notification of the decision result, the information sending server 1 transmits the information corresponding to the position of the designated mobile terminal device 2 through the network the designated mobile terminal device 2.

Furthermore, although in the above-described embodiment positional information providing server makes the grouping on the basis of the group identification information and makes the position decision through the use of the positional information on the specified terminal device, the present invention is not limited to this. The positional information providing server can also be constructed as follows.

That is, the positional information providing server can be composed of a decision condition storing unit configured to store desired decision positional information and unique information on a designated mobile terminal device in a state associated with each other, an information storing unit configured to store unique information on a mobile terminal device and positional information thereon in a state associated with each other, and a position decision unit, configured to make a decision as to whether or not there is a point of agreement between the decision positional information stored in the decision condition storing unit and the positional information on the mobile terminal device stored in the information storing unit, when the designated unique information stored in the decision condition storing unit and the unique information stored in the information storing unit agree with each other, with the position decision unit being configured to notify the decision result through a network to an information sending server for providing the positional information when the decision indicates that there is a point of agreement between the decision positional information and the positional information on the mobile terminal device. In this case, when the desired decision positional information and the unique information on the designated mobile terminal device are transmitted from the information sending server, the decision positional information and the designated unit information are stored in the decision condition storing unit in a state associated with each other (decision condition registration step) and, when the unique information and the positional information are transmitted from the mobile terminal device, the unique information and the positional information are stored in the information storing unit in a state associated with each other (registration step), and when the designated unique information stored in the decision condition storing unit and the unique information stored in the information storing unit agree with each other, a decision is made as to whether or not there is a point of agreement between the decision positional information stored in the decision condition storing unit and the positional information on the mobile terminal device stored in the information storing unit (position decision step), and when the position decision step indicates that there is a point of agreement between the decision positional information and the positional information on the mobile terminal device, the decision result is notified through the network to the information sending server for providing the positional information (positional information providing step).

Meanwhile, although the embodiment has been described as a positional information providing system, a positional information providing method, an information providing system, an information providing method, a positional information providing server, an information sending server and a terminal device (which will be referred to hereinafter as a positional information providing system and others), a program (positional information providing program) for realizing the positional information providing system and others can be stored in a computer-readable recording medium and distributed in a state stored in a recording medium and put on the market and bought/sold.

In addition, when the positional information providing program thus stored in a recording medium is installed in a computer (server or terminal device) so that the computer carries out this program, the positional information providing system and others described above in the embodiment are realizable and, hence, the positional information program stored in the recording medium can provide the effects similar to those obtainable by the aforesaid positional information providing system and others.

In this case, the recording medium includes, for example, a memory such as a semiconductor memory, a magnetic disk, an optical disk (for example, CD-ROM or the like), a magneto-optical disk (MO), a magnetic tape, a hard disk, a flexible disk, an IC card, a ROM cartridge, a punch card, a storage unit (memory such as RAM or ROM) in the interior of a computer, an external storage unit and others, which are capable of recording a program(s) Moreover, it is also possible to use various computer-readable mediums such as printed matter having printed codes, including bar codes. Incidentally, the CD-ROM, MO, magnetic tape, IC card and others are referred to as a portable recording medium.

Although in this case the positional information providing program is stored in a computer-readable recording medium, it is not always required to store the program in the recording medium. Moreover, without being stored in the aforesaid recording medium, the positional information providing program can also be transmitted (transmitted/received) through, for example, a network (communication network) serving as a transmission medium, which can distribute the positional information providing program and put it on the market and buy/sell it. For example, the positional information providing program can also be uploaded into a web server or the like and it can also be downloaded from a web server or the like through a network such as the internet.

The present invention is not limited to the above-described embodiment and, in addition to the above-described embodiment, it can be carried out while making all changes of the embodiment herein which do not constitute departures from the spirit and scope of the invention.

INDUSTRIAL APPLICABILITY

As described above, the present invention enables providing positional information on a mobile terminal device while protecting the privacy of a person possessing the mobile terminal device and realizing an information providing service using the positional information on the mobile terminal device, and it is considered that the availability thereof is extremely high.

The invention claimed is:

1. A positional information providing method configured to provide positional information on a desired mobile terminal device to an information sending server through the use of a positional information providing server connected through a network to said information sending server, comprising:

a position decision request step in which said information sending server transmits desired decision positional information and unique information on a designated mobile terminal device through said network to said positional information providing server;

a registration step in which a mobile terminal device transmits unique information thereon through said network to said positional information providing server;

a position decision step in which, when said designated unique information and said unique information agree with each other, said positional information providing server decides as to whether there is a point of agreement between said decision positional information and positional information on said mobile terminal device;

a positional information providing step in which, when the decision shows there is a point of agreement between said decision positional information and said positional information on said mobile terminal device, said positional information providing server notifies a result of the decision through said network to said information sending server for providing positional information; and a positional information registration step in which a specified terminal device existing in a short-distance radio-communicable range with respect to said mobile terminal device transmits group identification information to be used for grouping mobile terminal devices existing in said short-distance radio-communicable range and positional information thereon through said network to said positional information providing server, wherein said registration step further comprises said mobile terminal device receiving said group identification information transmitted from said specified terminal device through short-distance radio communication unit and transmitting said group identification information and unique information thereon through said network to said positional information providing server for conducting group registration, wherein in said position decision step, when said designated unique information and said unique information agree with each other, said positional information providing server makes a decision as to whether or not there is a point of agreement between said decision positional information and positional information on said specified terminal device, and wherein in said positional information providing step, when the decision shows that there is a point of agreement between said decision positional information and said positional information on said specified terminal device, said positional information providing server notifies a result of the decision through said network to said information sending server for providing the positional information.

2. A positional information providing system to provide positional information on desired mobile terminal devices for receiving information corresponding to positions of the desired mobile terminal devices, comprising:

a positional information providing server;

an information sending server to transmit desired decision positional information and unique information on a designated mobile terminal device through said network to said positional information providing server;

a mobile terminal device to transmit unique information thereon through said network to said positional information providing server; and a specified terminal device, existing in a short-distance radio-communicable range with respect to said mobile terminal device, configured to transmit group identification information to be used for grouping mobile terminal devices existing in said short-distance radio-communicable range and positional information thereon through said network to said positional information providing server, wherein the positional information providing server, when said designated unique information and said unique information agree with each other, decides whether there is a point of agreement between said decision positional information and positional information on said mobile terminal device, and when according to the decision there is a point of agreement between said decision positional information and said positional information on said mobile terminal device, said positional information providing server notifies a result of the decision through said network to said information sending server for providing positional information, wherein said mobile terminal device is configured to receive said group identification information transmitted from said specified terminal device through short-distance radio communication unit and transmits said group identification information and unique information thereon through said network to said positional information providing server, wherein said positional information providing server is configured to, when said designated unique information and said unique information agree with each other, decide whether there is a point of agreement between said decision positional information and said positional information on said specified terminal device, and wherein said positional information providing server is configured to, when the decision shows there is a point of agreement between said decision positional information and said positional information on said specified terminal device, notify a result of the decision through said network to said information sending server for providing positional information.

3. The positional information providing system according to claim 2, wherein, in a case in which said specified terminal device is a vehicle-mounted terminal device placed in a public transportation facility and a person possessing said mobile terminal device takes a ride in said public transportation facility, said mobile terminal device is configured to receive said group identification information transmitted from said vehicle-mounted terminal device through said short-distance radio communication unit and to transmit said group identification information and unique information thereon through said network to said positional information providing server.

4. The positional information system according to claim 2, wherein said specified terminal device comprises a basic radio communication unit configured to receive information from said information sending server; and a short-distance radio communication unit configured to make short-distance radio communication with respect to a mobile terminal device existing in a short-distance radio-communicable range and configured to transmit group identification information to be used for grouping mobile terminal devices existing in said short-distance radio-communicable range to a short-distance radio-communicable mobile terminal device.

5. The positional information providing system according to claim 4, wherein said basic radio communication unit of the specified terminal device further includes a positional information transmission processing unit configured to transmit positional information to a server configured to manage positional information on mobile terminal devices, and said positional information transmission processing unit is configured to transmit said group identification information together with said positional information.

6. The positional information system according to claim 2, wherein said mobile terminal device comprising:

a basic radio communication unit configured to receive information from said information sending server and configured to transmit said group identification information and unique information thereon; and a short-distance radio communication unit configured to make short-distance radio communication with respect to said specified terminal device and configured to receive group identification information to be used for grouping mobile terminal devices existing in a short-distance radio-communicable range with respect to said specified terminal device.

7. A positional information providing server connected through a network to an information sending server to provide positional information on a desired mobile terminal device to said information sending server, comprising:

a decision condition storing unit configured to store desired decision positional information and unique information on a designated mobile terminal device in a state associated with each other;

an information storing unit configured to store unique information and positional information on a mobile terminal device in a state associated with each other; and a position decision unit configured to decide as to whether there is a point of agreement between said decision positional information stored in said decision condition storing unit and said positional information on said mobile terminal device stored in said information storing unit, when said designated unique information stored in said decision condition storing unit and said unique information stored in said information storing unit agree with each other, wherein when the decision shows there is a point of agreement between said decision positional information and said positional information on said mobile terminal device, said position decision unit notifies a result of the decision through said network to said information sending server for providing positional information, wherein said information storing unit is a group information storing unit configured to store unique information on each mobile terminal device, group identification information to be used for grouping mobile terminal devices existing in a short-distance radio-communicable range with respect to a specified terminal device and positional information on said specified terminal device in a state associated with each other, wherein said position decision unit is configured to, when said designated unique information stored in said decision condition storing unit and said unique information stored in said group information storing unit agree with each other, decide as to whether there is a point of agreement between said decision positional information stored in said decision condition storing unit and said positional information on said specified terminal device stored in said group information storing unit, and wherein when the decision shows there is a point of agreement between said decision positional information and said positional information on said specified terminal device, said position decision unit notifies a result of the decision through said network to said information sending server for providing positional information.

8. The positional information providing server according to claim 7, further comprising:

a decision condition managing unit configured to store said decision positional information and said designated unique information in said decision condition storing unit in a state associated with each other, when said decision positional information and said designated unique information are transmitted from said information sending server; and a group information managing unit configured to carry out position registration processing in which, when said group identification information and said positional information are transmitted from said specified terminal device, said group identification information and said positional information are stored in said group information storing unit in a state associated with each other and further configured to carry out group registration processing in which, when said group identification information and said unique information are transmitted from said mobile terminal device, said group identification information and said unique information are stored in said group information storing unit in a state associated with each other.

9. The positional information providing server according to claim 8, wherein said group information managing unit deletes said unique information stored in said group information storing unit to cancel group registration when receiving, from said mobile terminal device, a notification to the effect that a reception level of an electric wave used for short-distance radio communication with respect to said specified terminal device falls below a predetermined level.

10. A positional information providing method comprising configured to provide positional information on a desired mobile terminal device to an information sending server in a state connected through a network to the information sending server, comprising:

a decision condition registration step of, when desired decision positional information and unique information on a designated mobile terminal device are transmitted from said information sending server, storing said decision positional information and said designated unique information in said decision condition storing unit in a state associated with each other;

a registration step of, when unique information and positional information are transmitted from a mobile terminal device, storing said unique information and said positional information in an information storing unit in a state associated with each other;

a position decision step of, when said designated unique information stored in said decision condition storing unit and said unique information stored in said information storing unit agree with each other, deciding whether there is a point of agreement between said decision positional information stored in said decision condition storing unit and said positional information on said mobile terminal device stored in said information storing unit;

a positional information providing step of, when the decision in said position decision step shows there is a point of agreement between said decision positional information and said positional information on said mobile terminal device, notifying a result of the decision through said network to said information sending server for providing positional information; and a positional information registration step of, when group identification information to be used for grouping mobile terminal device existing in a short-distance radio-communicable range and positional information are transmitted from a specified terminal device, storing said group identification information and said positional information in said information storing unit in a state associated with each other, wherein said registration step is configured as a group registration step of, when said group identification information and said unique information are transmitted from each mobile terminal device, storing said group identification information and said unique information in said information storing unit in a state associated with each other for group registration, wherein said position decision step is configured to, when said designated unique information stored in said decision condition storing unit and said unique information stored in said information storing unit agree with each other, make a decision as to whether or not there is a point of agreement between said decision positional information stored in said decision condition storing unit and said positional information on said specified terminal device stored in said information storing unit, and wherein said positional information providing step is configured to, when the decision in said position decision step shows that there is a point of agreement between said decision positional information and said positional information on said specified terminal device, notify a result of the decision through said network to said information sending server for providing positional information.

* * * * *